Feb. 6, 1934.   C. R. BIRDSEY   1,946,056
APPARATUS FOR FORMING WALL BOARD INTO BUNDLES
Filed July 30, 1928   6 Sheets-Sheet 1

INVENTOR
Charles R Birdsey
BY
L. A. Paley
ATTORNEY

Feb. 6, 1934.   C. R. BIRDSEY   1,946,056
APPARATUS FOR FORMING WALL BOARD INTO BUNDLES
Filed July 30, 1928   6 Sheets-Sheet 3

INVENTOR
Charles R. Birdsey
BY
L. A. Paley
ATTORNEY

Fig 9

Feb. 6, 1934.  C. R. BIRDSEY  1,946,056
APPARATUS FOR FORMING WALL BOARD INTO BUNDLES
Filed July 30, 1928  6 Sheets-Sheet 5

INVENTOR
Charles R. Birdsey
BY
L. A. Paley
ATTORNEY

C. R. BIRDSEY 1,946,056
APPARATUS FOR FORMING WALL BOARD INTO BUNDLES
Filed July 30, 1928  6 Sheets-Sheet 6

INVENTOR
Charles R Birdsey
BY L.A.Paley
ATTORNEY

Patented Feb. 6, 1934

1,946,056

UNITED STATES PATENT OFFICE 1,946,056

APPARATUS FOR FORMING WALL BOARD INTO BUNDLES

Charles R. Birdsey, Hinsdale, Ill., assignor to United States Gypsum Co., Chicago, Ill., a corporation of Illinois Application July 30, 1928. Serial No. 296,354

20 Claims. (Cl. 216—9)

This invention relates to apparatus for forming wallboard or other articles into bundles and has reference more particularly to apparatus for applying binding strips to opposite edges of bundles of wallboard preparatory to shipment.

In the building industry, a number of wallboards, plaster boards and plaster wallboard have been developed which have, to a considerable extent, become substitutes for the ordinary and well known forms of wood lath. These substitutes may comprise layers of cementitious or plastic materials such as gypsum, between cover sheets of paper or the like. The wallboards or plaster boards, when applied to the studs or rafters of a building, form a suitable base on which plaster can be applied directly and a bond is formed between the plaster so applied and the paper cover sheet of the wallboard or plaster board. These wallboard or plaster board lath are usually made in a width of 16" and lengths of 32" and 48" respectively. The folded or reinforced edges of these plaster board lath are made under Patent No. 1,034,746 and others, and are preferably arranged so that the folded or reinforced edge runs lengthwise of the board.

Under the old practice, wallboard or plaster board was made in considerably larger sizes and was erected with the reinforced folded edge extending along the studs and the unreinforced or rough cut edge extending across the studs. With the improved form of wallboard, the reinforced or folded edges of the boards are preferably designed to extend across the stud so as to avoid cracking of the plaster at these abutting edges which was formerly experienced with the older type of plaster board. In addition, I have applied another further novel step by developing means for supplying the smaller dimensioned boards especially constructed for plastering units, in a bundle, where each bundle will contain approximately the same plastering base area which is contained in a standard bundle of wood lath. By means of this novel step, there is no confusion in figuring the amount of lathing units required or ordering same, because this new plaster board lathing unit or bundle can be ordered as such just the same as bundles of wood lath have been ordered for many years. This improved plaster board bundle is more specifically described and claimed in my pending application Serial No. 201,578, filed June 22, 1927. However considerable difficulty has been encountered in forming these plaster board lath into compact, tight bundles, free from internal shifting action.

An object of this invention, therefore, is to provide means for forming these plaster board lath into compact, tight bundles which may be readily handled and transported.

A further object of the invention is to provide an apparatus or machine for carrying out the improved method and for applying binding strips to the edges of the bundles of plaster board lath; also to improve lath bundles and their method of manufacture in other respects hereinafter specified and claimed.

Reference is to be had to the accompanying drawings forming a part of this specification, in which:—

Referring to the drawings by numerals, 19 indicates a bundle of wallboard or plaster board lath which may be composed of six individual plaster boards, each being 16" wide and 32" long. These individual boards are preferably formed of a cementitious or plastic material, such as gypsum, between cover sheets 20 of paper or the like, the boards having folded edges 21 running lengthwise thereof. While it is possible to apply a binding strip 22 to the raw or cut edges of board 23, it is preferable to apply these binding strips along the folded edges 21 of these boards for forming same into compact, tight bundles. These binding strips are preferably made of tough paper which have flaps 25 extending over each outer face of the outer board and being attached thereto by means of an adhesive. Adhesive may be applied the full width of the binding strip 22 and flaps 25, so that the binding strip 22 will also adhere to the folded edges 21, but this is ordinarily not necessary since the friction between the boards is sufficient to prevent them from shifting out of alignment.

After manufacturing the plaster board and cutting same to the desired length, same are manually formed into bundles of say six in number, and are manually deposited on a roller conveyor 27, located at the head or feed end of the machine. A chain conveyor 28 is movably supported upon an idler sprocket 29 and a drive sprocket wheel 30, the sprocket wheel 29 being located adjacent the delivery end of roller conveyor 27. The drive sprocket wheel 30 is continuously driven by any suitable means such as motor 31 connecting to a speed reducer 32, sprocket wheel 33, chain 34 and sprocket wheel 35 to shaft 36 on which the sprocket wheels 30 are secured. Preferably the pair of sprocket wheels 30 is secured in spaced relation on the shaft 36 and the pair of sprocket wheels 29 is secured on the shaft 37, these shafts 36 and 37 being rotatably supported in bearings upon suitable steel frame work 38. The conveyor chains 28 are also preferably two in number and are connected by transverse strips 39 which serve to engage the end of the bundles of board and move same forwardly of the machine to receive their binding strips. It should be understood that the bundles are preferably moved manually from the roller conveyor 27 into engagement with the conveyors 28 but automatic means for this purpose may be provided if desired.

Figures 17, 18:
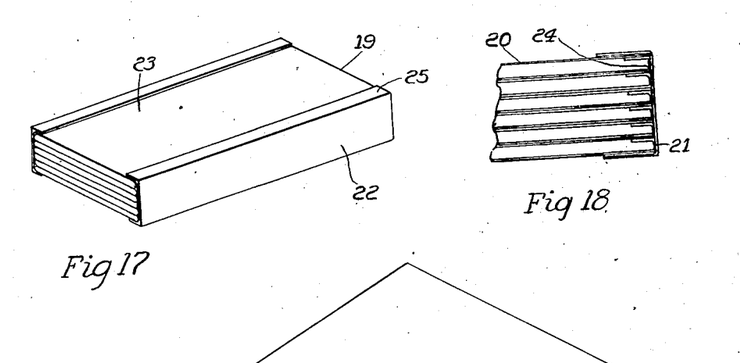
Figure 17 is a perspective view of the finished bundle.
Figure 18 is a fragmentary, end view showing the completed bundle with the binding strips applied to the bundle adjacent the folded edges of the plaster board lath composing same.

It is thus seen that the bundles of boards with edges in substantial alignment, move forwardly of the machine under the action of the strips 39 until they reach vertically extending rollers 40 which engage the edges of the boards and bring them into exact alignment. Rolls of paper 41 are rotatably supported on shafts 42, the latter being supported in slots formed in frame work 43. These paper binding strips 22 are of sufficient width to overlap each face of the outermost boards of the bundles as seen in Figures 17 and 18. The paper strips first pass under rollers 44 and then over a gluing roll 45 which applies glue or adhesive to the inner faces of flaps 25 or to the entire inner face of strip 22. The lower part of gluing roll 45 dips into a pan of glue or other suitable adhesive 46. The roll 45 may be positively driven if desired by a sprocket wheel 45A and engaging chain 28. The binding strips next pass under rolls 47 and then upwardly over arms 48 which are bent at suitable angles to properly turn the strip to the desired angle before application to the edges of the bundle. The binding strips then pass forwardly of the machine and are turned into a vertical plane by rollers 49 positioned adjacent and parallel to each edge of the bundle, these rollers 49 being spaced apart substantially the width of the bundles, but leaving room for the binding strip to pass between the bundles and said rollers. A reserve roll 50 of the binding paper is provided in the frame work 43 for use when the supply of paper in the roll 41 has become exhausted.

Figures 10, 12, 13, 14, 15, 16:
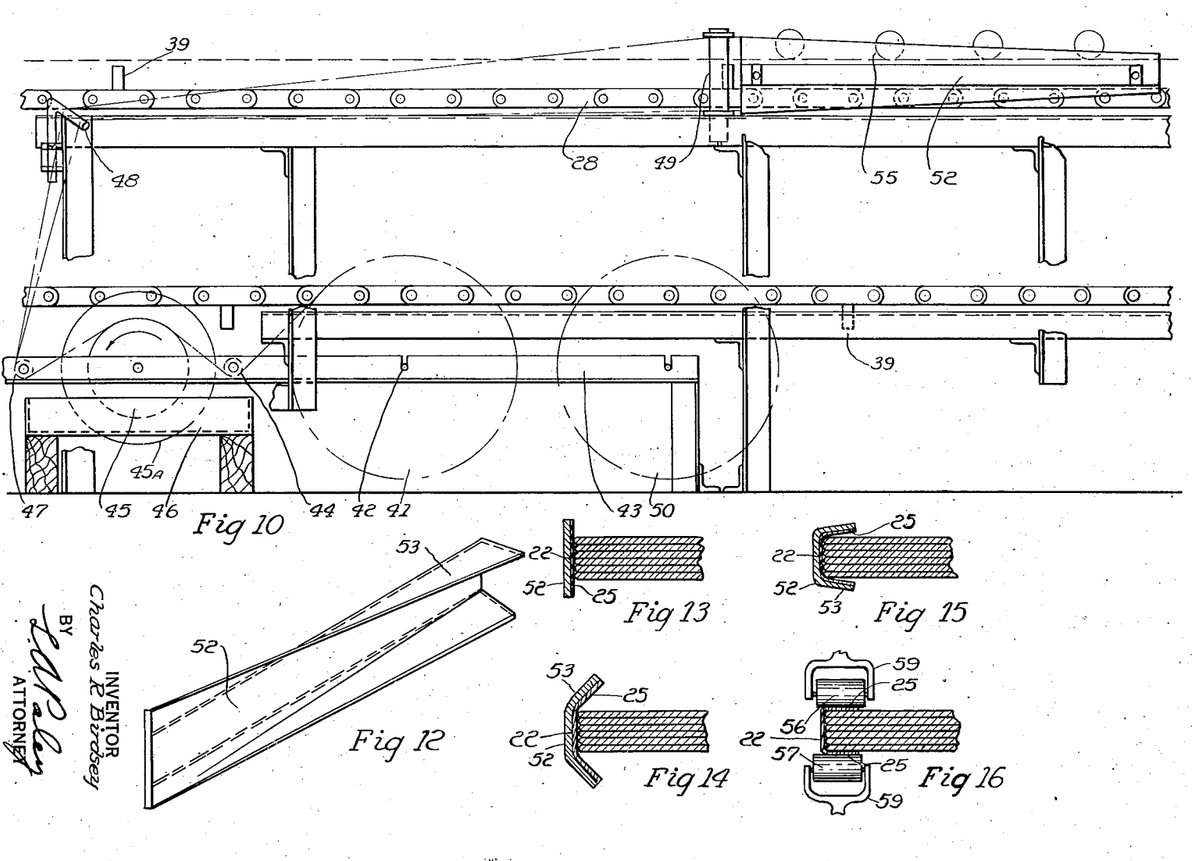
Figure 10 is an enlarged elevation of the portion of the bundling machine where the paper binding strips are applied to the bundle.
Figure 12 is a perspective view of the binding strip-forming device.
Figures 13, 14, 15 and 16 are transverse fragmentary sectional views through the bundle as it passes from one station to another in the bundling machine.

The binding strips 21 have now been positioned as shown in Figure 13, adjacent the edge of the board bundle and at this station in the machine, a forming strip or channel 52 is provided, this channel having legs 53 above and below which gradually fold over the flap 25 of binding strip 22, first as shown in Figure 14 and then as shown in Figure 15 to bring said flap to a position adjacent the face of each outer wallboard in the bundle. At the station in the machine opposite the folding channel 52, a series of rollers 55 is provided near the center of the wallboard, these rollers exerting downward pressure so as to force the wallboards together into compact bundles and to force the air out from between the wallboard in preparation for the application of the binding strips along the edges of said bundles. These rollers 55 are preferably pressed downwardly under the action of springs not shown. After the bundles leave the folding channel 52, rollers 56 are applied to the top flaps 25 of the binding strip and rollers 57 are applied to the bottom flaps of said strip, said rollers 56 and 57 being urged toward each other under the resilient action of the steel frame work 58 forming a support for the brackets 59 in which said rollers are rotatably mounted. The action of these rollers 56 and 57 is to tightly compress the edges of the wallboards into a compact bundle and also to press the flaps 25 tightly into contact with the outermost wallboards of the bundle.

After the bundles have passed beyond the rollers 56 and 59, it is desired to maintain the pressure on the flaps 25 until the adhesive has hardened or set and for this purpose a conveyor 60 is provided, the lower reach of which rests on top of the bundles, being pressed firmly thereupon by means of spring pressed rollers 61. The friction between the conveyor 60 and the top of the bundles, causes the conveyor to move continuously around idler pulleys 62 and 63. Similar conveyor belts 64 are arranged with their upper reaches in contact with the bottom flaps of the bundles, said reaches being pressed upwardly by means of spring pressed rollers 65 so as to maintain firm contact against the lower flaps 25 until the adhesive has set. A pair of idler pulleys 67 is provided adjacent the upper reach of the conveyor belt 60, a takeup pulley 68 being mounted between the pulleys 67 and being provided with a screw adjustment 69 for the purpose of insuring that the conveyor belt 60 is under tension at all times. A similar pair of pulleys 70 is provided adjacent the lower reach of the conveyor belts 64, and a takeup pulley 71 adjusted by screws 72, maintains the tension in the lower conveyor belts 64. In order to make sure that the conveyor belts 60 and 64 run at the same speed and that they do not slip, the shafts 74 and 75 which support the conveyor pulleys adjacent the delivery end of the machine, are geared together by means of gears 76 and 77 respectively.

Figure 1:
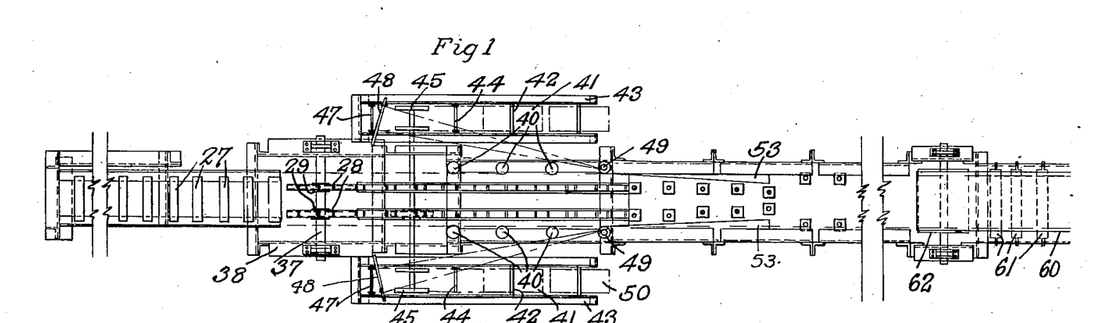
Figures 1 and 2 are a plan view and elevation, respectively, of the feed end of the bundling machine.
Figure 2:
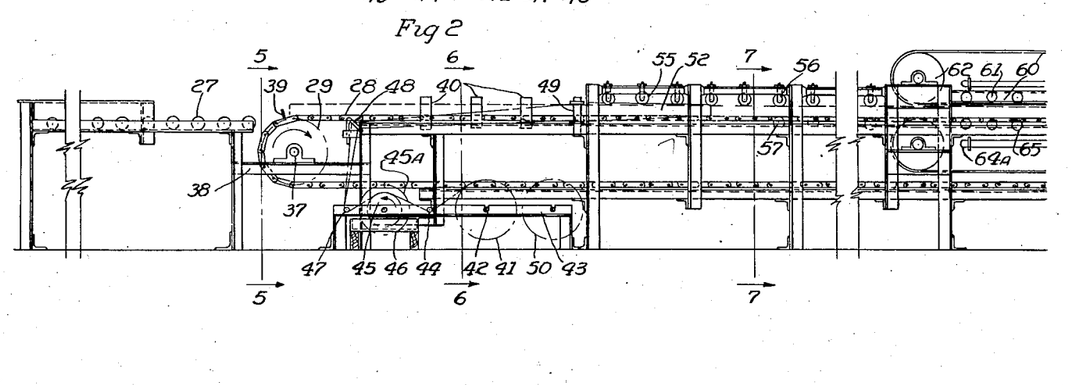
Figure 3:
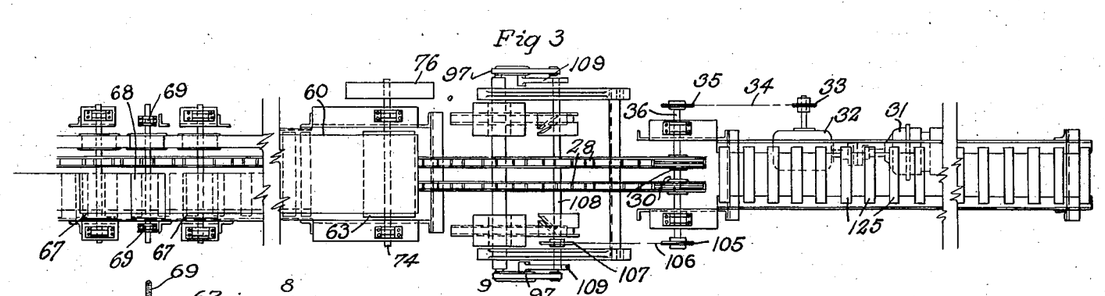
Figures 3 and 4 are a plan view and elevation respectively of the delivery end of the bundling machine.
Figure 4:
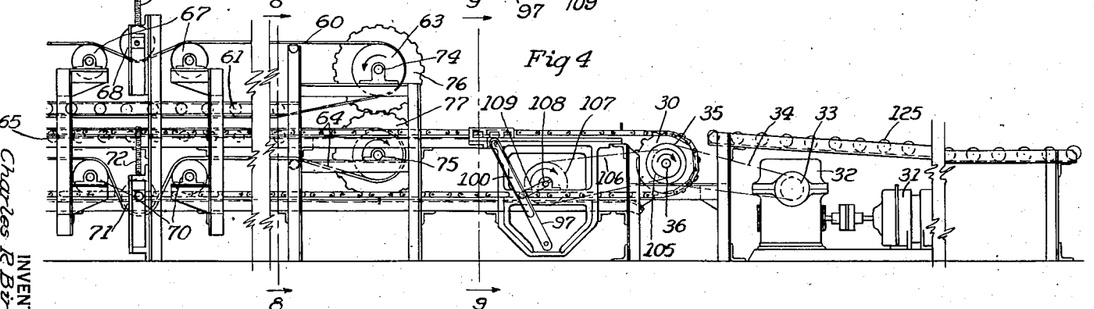
Figure 5:
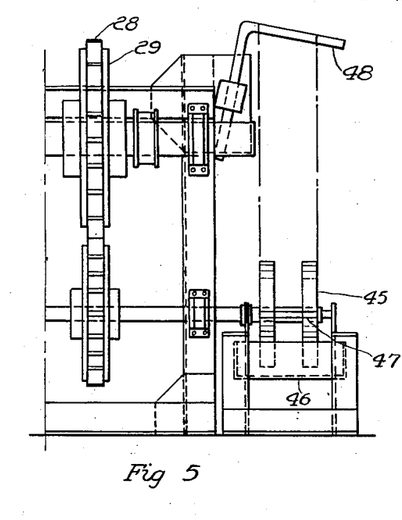
Figures 5, 6 and 7 are transverse sectional views taken on the lines 5—5, 6—6 and 7—7, respectively, of Figure 2.
Figure 6:
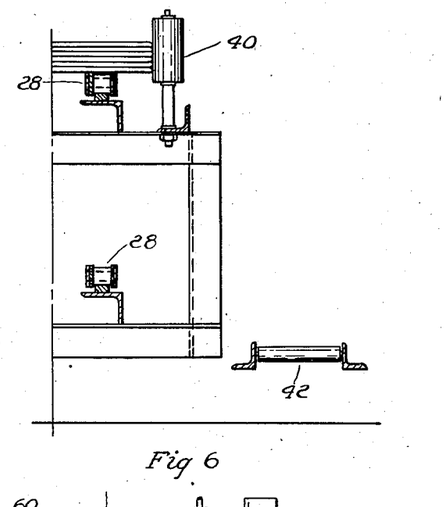
Figure 7:
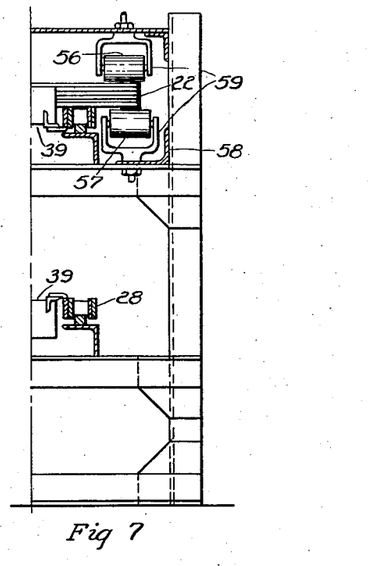
Figure 8:
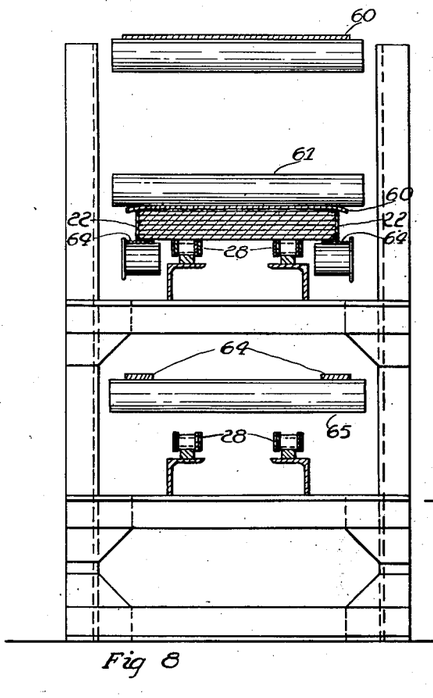
Figures 8 and 9 are transverse, sectional views through the bundling machine taken on the lines 8—8 and 9—9 of Figure 4, respectively.

The lower reach of the upper conveyor belt 60 is wide enough to cover the entire top surface of the bundles as shown in Figure 8 while the two lower conveyor belts 64 are arranged, one on each side in contact with the flaps 25, the driving chain conveyors 28 extending between said conveyor belts 64. Heat may be applied if desired adjacent the belts 60 and 64 by means of steam coils 64A (Fig. 2) and in order to hasten the setting of the adhesive and thus reducing the necessary length of the machine.

Figure 9:
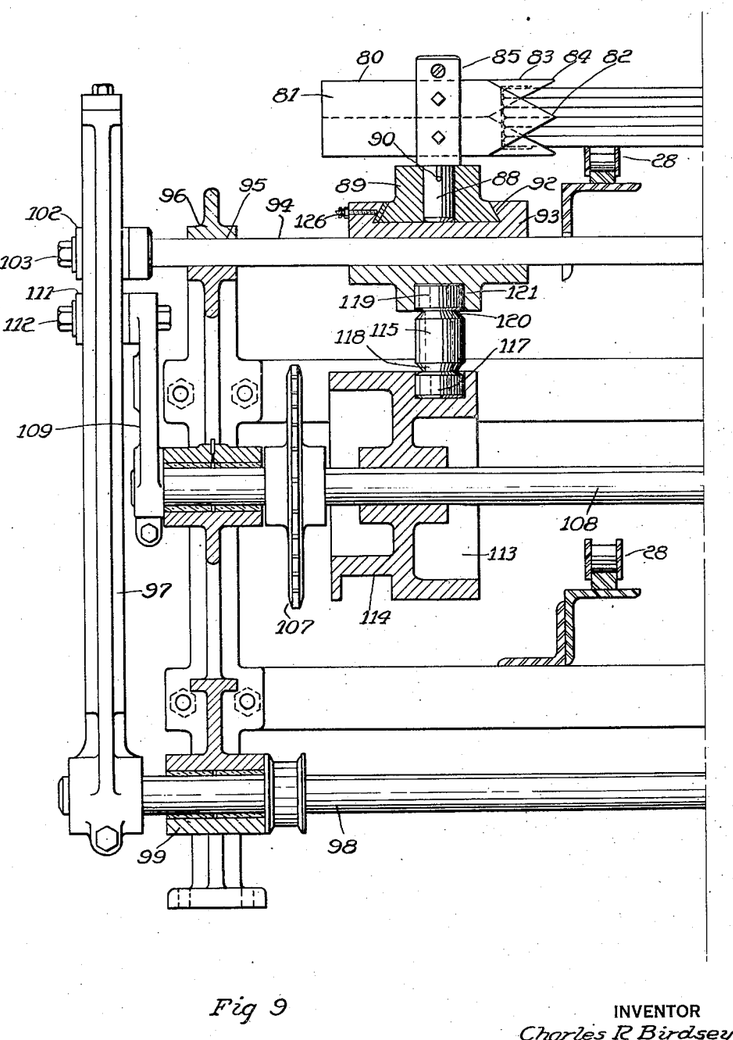
Figure 11:
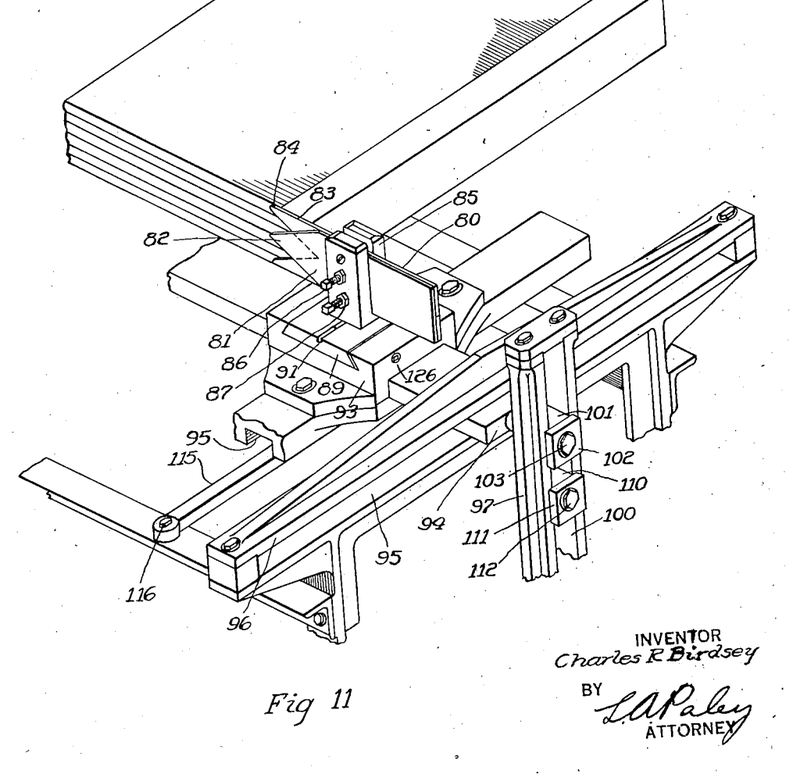
Figure 11 is a fragmentary, perspective view showing the mechanism for cutting the binding strips after application for the purpose of severing the bundles one from the other.

As the bundles pass out from between the conveyor belts 60 and 64, the bundles may be severed one from the other or cut apart by a workman or by any other suitable means but for the preferred form, it is desirable to accomplish this cutting by means of an automatically operated knife or knives during the continuous movement of the bundle. For this purpose, a composite knife 80 is provided which is composed of the flat knife 81 having a central point 82 and a pair of flat knives 83 each having a point 84 adjacent one edge, so that the three knives form three points as seen in Figures 9 and 11, the two points 84 being spaced apart at a distance somewhat greater than the thickness of the finished bundle. A pair of such composite knives 80 are provided one adjacent each binder strip 22 with the knife points 82 and 84 of each composite knife 80 directed inwardly toward the bundle.

The mechanism to be hereinafter described is adapted to cause the composite knives 80 to move forwardly at approximately the same speed as the bundles and to suddenly enter the bundle at the junction of a pair of bundles so as to sever the binding strip 22 and its flaps 25 with a short quick stroke. For this purpose, a composite knife holder is provided, said holder having a forked end 85 which is adapted to receive the composite knife 80, set bolts 86 with lock bolts 87 being provided to maintain said knife 80 in position in said holder. A circular section 88 is provided at the lower end of the holder 85, said section 88 being adapted to be received in a suitably sized hole in a slide bracket 89, a pin 90 secured to the section 88 being adapted to engage in a slot 91 in the slide bracket 89 so as to prevent the rotation of the composite knife 80 and the holder 85. The slide bracket 89 is provided with a pair of parallel dove-tailed shoulders 92 which engage in a similarly shaped slot formed in carriage 93. The carriage 93 is slidably mounted upon a bar 94, the ends of which are received in a suitable slide way 95, formed in the machine frame work 96. The forward movement of the bar 94 and carriage 93 with the moving bundles, is accomplished by a lever 97 secured at its lower end to a transverse shaft 98, the latter being mounted in suitable bearings 99, formed in the frame work of the machine. A slide way 100 is formed in the upper end of lever 97, said slide way being adapted to receive a trunnion 101 formed on the outer end of the bar 94, said trunnion being provided with a washer 102 fixed by bolt 103 to said trunnion to maintain said trunnion in slidable connection with the lever 97. A sprocket wheel 105 is secured to one end of the shaft 36, and is connected by a chain 106 to a similar sprocket wheel 107 secured to a shaft 108 which is rotatably mounted in suitable bearings secured to the frame of the machine. A crank 109 is secured to each end of the shaft 108, the outer end of each crank being provided with a trunnion 110 which is slidably received in the slideway 100 and is provided with a washer 111 fixed in position by bolt 112. The rotation of the crank 109 thus causes the rocking of the lever 97 about the shaft 98 which in turn moves the carriage 93 and bar 94 backward and forward, the forward motion being substantially the same speed as the movement of the bundles of wallboard.

In order to cause the in and out movement of the composite knives 80, the shaft 108 carries a cylindrically shaped cam 113 a suitably shaped cam groove 114 being formed around its outer surface. A bar 115 is pivotally mounted at its rearward end on a bolt 116, the latter being secured to the frame work of the machine. A roller 117 is rotatably mounted on a stud 118 secured to the lower forward end of the arm 115, said roller being adapted to engage the cam groove 114. A roller 119 is rotatably mounted on a stud 120 secured to the upper, forward end of the arm 115, said roller 119 being adapted to be received in a slot 121 formed on the under side of carriage 93. After the bundles are severed one from the other by the composite knives 80, they pass from the chain conveyor 28 onto a roller conveyor 125 which is preferably at a slight inclination so as to carry the finished bundles under gravity to a discharge point ready for shipment. It will be seen from Figure 11 that the slide bracket 89 is adjustably supported in the carriage 93 and is secured in any adjusted position by means of set bolts 126 so that the composite knives can be exactly aligned with the junction between two adjacent wallboard bundles.

In the operation of the machine, the plaster boards in rough bundles, are deposited upon the roller conveyor 27 and then passed on to the chain conveyor 28 where strips 39 pick up each bundle of boards and carry the same forwardly of the machine between rollers 40 where the edges of the boards are exactly aligned to form a bundle. This bundle then passes under rollers 55 which compress it, and the strip 22 of binding paper then passes from roll 41 around roller 44, gluing roller 45, roller 47 and arm 48 into position between the rollers 49 and the edges of the bundle. The channel strips 52 then fold the flaps 25 of the strips 22 into contact with the surfaces of the wallboard bundle and rollers 56 and 57 then press the flaps 25 firmly against the bundle. The bundles now pass between the adjacent reaches of the conveyor belts 60 and 64 where the adhesive securing the flaps to the bundle is allowed to set and harden. After the bundles pass forwardly out of contact with the conveyor belts 60 and 64, they are engaged by composite knives 80 which move forwardly with the bundle and then quickly enters the junctions of the bundles thus severing the binding strips 22, the points 84 serving to sever the flaps 25 with an inwardly directed cut. The composite knives 80 are supported by holders 85 which are secured loosely to slide brackets 89, the latter being adjustably secured to carriages 93. The carriages 93 are slidably mounted for movement transverse of the machine, on a bar 94, the latter being mounted for movement longitudinal of the machine under the action of a lever 97 which operates on a trunnion 101 formed one on each end of the bar 94. The rocking of the levers 97 is accomplished by cranks 109 which rotate continuously with shaft 108, the trunnions 110 on cranks 109 operating in slideways 100 formed in the levers 97. A motor 31 operates speed reducer 32, sprocket 33, chain 34 and sprocket 35 so as to cause the movement of the conveyor chain 28 and carry the bundles forwardly of the machine. Shaft 108 is rotated by sprocket wheel 107 chain 106 and sprocket wheel 105 to control the movement of the composite knives 80 longitudinally of the machine.

The transverse movement of the composite knives 80 is accomplished by cams 113 fixed to shaft 108, a roller 117 secured to an arm 115 operating in the groove 114 formed on said cam. The rearward end of arm 115 is pivotally mounted on bolt 116 secured rigidly to the frame of the machine and a roller 119 is rotatably mounted on the upper, forward end of arm 115 so as to operate in groove 121 formed in the underside of carriage 93. It will be seen that the knife holder 85 can be quickly slipped out of the slide bracket 89 and replaced by a new knife without stopping the operation of the machine.

While the above described method and apparatus represents a practical embodiment of my invention, I do not limit myself specifically to the details herein illustrated and described since manifestly the same can be considerably varied without departing from the spirit of the invention as defined in the appended claims.

Having thus described my invention, I claim as new and desire to secure by Letters Patent:—

1. In a bundling machine, means for receiving a plurality of wallboards in face to face relation, means for continuously advancing said wallboards, means for aligning the edges of said wallboards, means for applying fibrous binders to the opposite edges of said wallboard bundles to prevent said wallboard edges from becoming out of alignment, and means for severing said fibrous binding elements so as to separate the bundles one from the other, said severing means comprising cutters movable in synchronism with the continuous movement of said wallboards and also movable transversely of said wallboards to sever the binding elements at each of said opposite edges of said wallboards.

2. In a bundling machine, means for continuously advancing a plurality of bundles of wallboard in end to end position, means for applying a continuous strip of fibrous binder to each of two opposite edges of said series of wallboard bundles, and means for severing said binder strips at the junctions of said bundles during the continuous movement of said bundles, said severing means comprising cutters movable in synchronism with the continuous movement of said wallboards and also movable transversely of said wallboards to sever the binding elements at each of said opposite edges of said wallboards.

3. In a bundling machine, means for receiving a plurality of wallboards in face to face position with edges of said board in alignment to form a bundle, means for advancing a series of said bundles continuously, means for applying pressure to such bundles during the continuous movement thereof, means for continuously applying a continuous strip of fibrous binding material to the edges of said series of bundles during the continuous movement thereof, and automatic means for separating said bundles one from the other after the application of said binding strips.

4. In a bundling machine, means for continuously advancing a series of wallboard bundles, means for applying a fibrous binding strip to the edges of said series of bundles, a severing knife, means for causing said knife to move at substantially the same speed and in the same direction as the wallboard bundles, and means for moving said knife inwardly to sever said binding strip at the junction of adjoining bundles during the continuous movement of said bundles.

5. In a bundling machine, means for continuously advancing a series of wallboard bundles, means for applying a binding strip to the opposite edges of said bundles, means for applying adhesive to such strip before application to said bundles, a conveyor belt adapted to press against said binding strip after application to said bundles to permit the setting of said adhesive, and means for maintaining an adjustable tension on said conveyor belt.

6. In a bundling machine, means for advancing a series of wallboard bundles, means for applying a binder strip to opposite edges of said bundles, a plurality of knives adapted to sever said binding strips at the junction of adjacent bundles, and means controlled by the movement of said bundles for operating said knives.

7. In a bundling machine, means for advancing a series of wallboard bundles, means for applying a binder strip to the opposite edges of said series of bundles, a plurality of knives for severing said binding strips, and crank means adapted to move said knives at substantially the same speed as said bundles.

8. In a bundling machine, means for advancing a series of wallboard bundles, means for applying a binder strip to the opposite edges of said bundles, a plurality of knives for severing said binding strips to form individual bundles and cam means adapted to cause the movement of said knives to engage such binding strips.

9. In a bundling machine, means for advancing a series of wallboard bundles, means for applying a binder strip to opposite edges of said series of bundles, a plurality of knives, crank means for moving said knives at substantially the same speed of said bundles and cam means adapted to move said knives transversely of the machine to cause said binder strips to be severed to form individual bundles.

10. In a bundling machine, means for advancing a series of wallboard bundles, means for applying a binder strip to opposite edges of said series of bundles, means for folding a portion of said binding strip over said bundles to form flaps attached to the surface of the outer boards in said bundles, a composite knife adapted to sever said binding strips and to also sever such flaps with an inward cut, and means for actuating said knives.

11. In a bundling machine, means for advancing a series of wallboard bundles with a continuous motion, means for applying a binder strip to opposite edges of said bundles, means for applying an adhesive to said strip before application to said bundles, means for folding a portion of said binding strip over said bundles to form flaps attached to the surface of the outer boards in said bundles, means for applying heat to said flaps to hasten the setting of said adhesive, and automatic means for severing said binder strips between adjacent bundles to separate the latter one from the other.

12. A packaging machine for the purpose described comprising a track along which the materials to be packaged are continuously advanced, a pair of folders mounted on opposite sides of said track and in the path of said materials, means for guiding adhesive binding strips into said folders to be thereby folded around the edges of said materials and pairs of rotary, sealing members positioned beyond said folders and acting to seal the marginal portions of the strips against the upper and lower faces of said packaged materials.

13. A machine for packaging piles of sheet material, comprising means for supporting and continuously advancing said piles, folders mounted on opposite sides of the path of said piles, means for guiding strips of binding material from a continuous supply to said folders, to be folded thereby around the side edges of the advancing piles, means coacting with said supporting and advancing means to press the material together during the application of said binding strips, and a pair of rotary sealing members located beyond said folders and adapted to engage the edge faces of said packages to tightly seal the binding strips around the same.

14. A packaging machine for the purpose described comprising means for supporting and continuously advancing a plurality of sheets of the material to be packaged in superposed piled relation, a pair of folders mounted on opposite sides of the path of said piles of sheets, means for guiding adhesive binding strips into said folders to be thereby folded around the edges of said piles, and pairs of rotary sealing members positioned beyond said folders and acting to seal the marginal portions of the strips against the upper and lower faces of the top and bottom sheets, respectively, of said piles.

15. A machine of the type described, comprising in combination conveyor means for carrying along in superposed piled relation a plurality of pieces of board, and means adapted as the pieces pass forward to apply adhesive tape binders about edge portions of the pile for holding the pieces of board together in unit bundle form.

16. A machine of the type described, comprising in combination conveyor means for carrying along in superposed piled relation a plurality of pieces of board, pressure means free to move either upwardly or downwardly and arranged to have its principal support from successive piles of boards for pressing the boards together as they move foward, and means adapted as the compressed pile moves forward to apply adhesive tape binders to edge portions of the pile for holding the pieces of board together in unit bundle form.

17. In a machine of the class described, the combination of conveyor means comprising an endless belt for carrying forward a plurality of pieces of board in superposed piled relation, pressure means free to move either upwardly or downwardly and arranged to have its principal support from successive piles of board for pressing the boards together as they move forward, and means adapted as the compressed piles move forward to apply adhesive tape binders about opposite edge portions of successive piles for holding the pieces of board together in compressed unit bundle form.

18. A machine of the type described, comprising in combination conveyor means for carrying along in superposed piled relation a plurality of pieces of board, weighted pressure means floatingly mounted so as to be supported principally by said piles of boards for applying yielding downward pressure on said piles as they pass along, and means adapted as the pieces pass forward to apply adhesive tape binders about edge portions of the pile for holding the pieces of board together in unit bundle form.

19. A machine of the type described, comprising in combination conveyor means for carrying forward a plurality of pieces of board in superposed piled relation, means adapted as the boards pass forward to apply adhesive tape binders about opposite edges of the pile, pressure means for pressing the boards firmly together as they approach said binder applying means, and other pressure means in spaced relation to said first named pressure means on the opposite side of said binder applying means for continuing the pressure on said boards as they pass forwardly.

20. A machine of the type described, comprising in combination conveyor means for carrying forward a plurality of pieces of board in superposed piled relation, means adapted as the boards pass forward to apply adhesive tape binders about opposite edges of the pile, floatingly mounted pressure means in rear of said binder applying means for applying initial pressure to the boards, and other floatingly mounted pressure means serving to apply downward pressure on said boards in advance of the binder applying means before said boards pass out of the influence of said first named pressure means.

CHARLES R. BIRDSEY.